June 11, 1968     G. SARVADI, JR     3,387,430
HYDROCHLORIC ACID PROCESS
Filed May 7, 1965
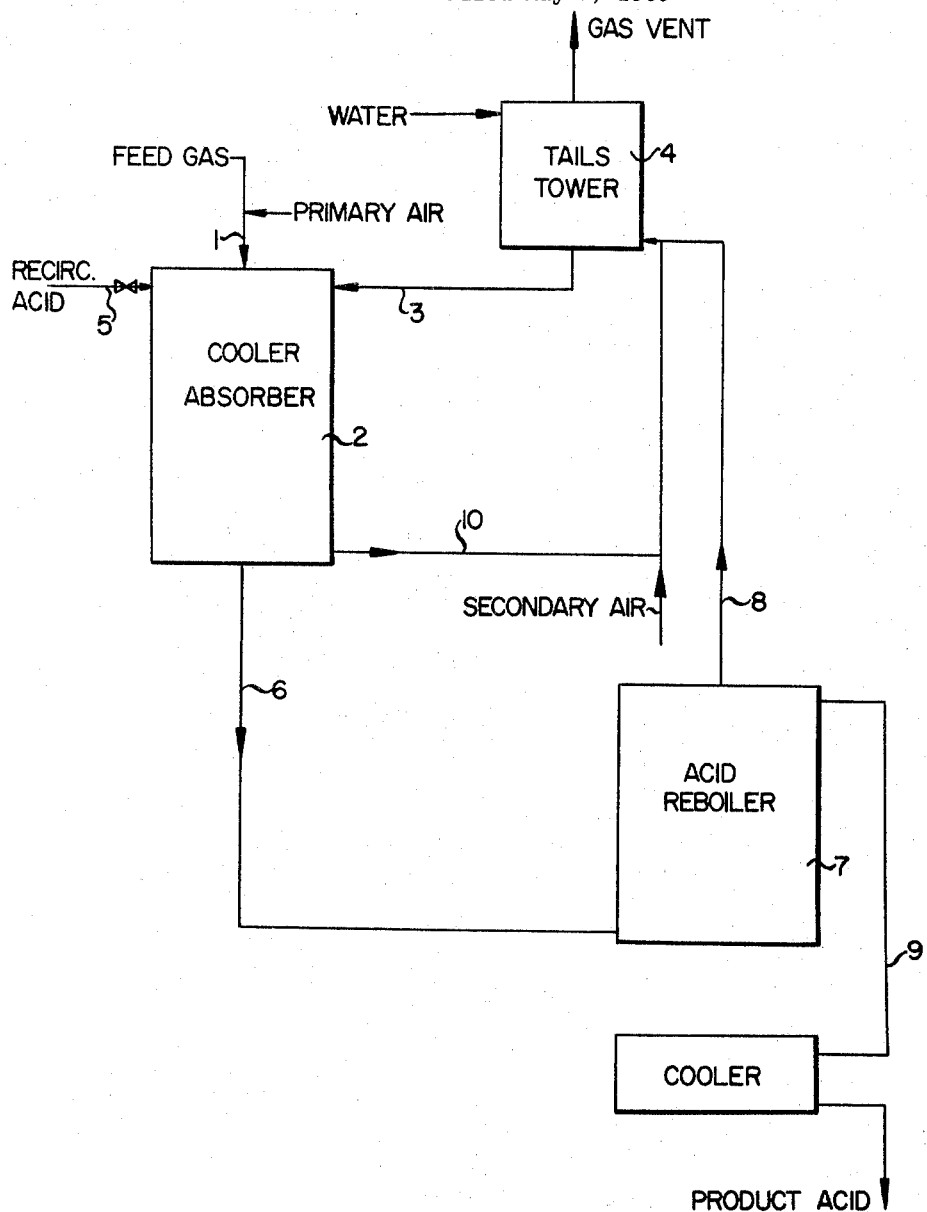
INVENTOR.
GEORGE SARVADI, JR.
BY
Oberlin, Maky & Donnelly
ATTORNEYS United States Patent Office 3,387,430
Patented June 11, 1968

3,387,430
HYDROCHLORIC ACID PROCESS
George Sarvadi, Jr., Aurora, Ohio, assignor to Falls Industries Incorporated, Solon, Ohio, a corporation of Ohio
Continuation-in-part of application Ser. No. 162,885, Dec. 28, 1961. This application May 7, 1965, Ser. No. 458,811
9 Claims. (Cl. 55—51)

This application is a continuation-in-part of Ser. No. 162,885, filed Dec. 28, 1961 and now abandoned.

This invention relates to the production of hydrochloric acid and more particularly to the production of high purity, concentrated hydrochloric acid from a hydrogen chloride feed gas stream containing a substantial amount of organic contaminant.

The production of hydrochloric acid by the aqueous absorption of hydrogen chloride from a feed gas stream is well known. To provide high purity, concentrated hydrochloric acid, however, it has been the practice in the art to utilize a feed gas stream containing as high a percentage of hydrogen chloride (HCl) as possible which is free from high-boiling, absorbable contaminants. To produce 22° Baumé acid (about 36% hydrogen chloride by weight) it has been preferred to use a gas stream containing as high a percentage of hydrogen chloride as possible (preferably about 98%) but containing less than 50-100 p.p.m. contaminant. In the chlorination of hydrocarbons, e.g., to produce trichloroethylene, hexachlorobenzene, etc., a by-product gas stream is available which contains greater than 90% HCl; however, as high as 10% chlorinated hydrocarbon is also present as a contaminant. Since the latter generally have boiling points higher than the hydrochloric acid to be produced, they will condense concurrently with the HCl and contaminate the acid being produced and thereby render it unsuitable for many purposes. Previously known separation processes are only suitable to reduce the amount of these organic contaminants to the range of about 350 to 1100 p.p.m.

It is therefore a principal object of this invention to provide high purity, concentrated hydrochloric acid from a hydrogen chloride gas stream containing a substantial amount of organic contaminants.

Another object is to provide such a process which will produce 22° Baumé acid having less than 350 p.p.m. of organic contaminant therein and in its preferred embodiment having even less than 50 p.p.m. contaminant.

A further object is to provide such a process which can be simply accomplished during the absorption operation without the necessity of special distinct separation procedures or materials.

Other objects and advantages of the present invention will become apparent as the following description proceeds.

To the accomplishment of the foregoing and related ends, the invention, then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

The drawing schematically illustrates the novel process and apparatus of this invention.

The above and other objects are achieved by means of the present invention in which a process is provided for the production of hydrochloric acid by the absorption of hydrogen chloride by an aqueous absorbent from hydrogen chloride gas streams which contain substantial amounts of chlorinated organic contaminants. By the present invention, an improved process is provided in which the partial pressure of such contaminants is reduced by diluting the hydrogen chloride gas feed stream with an inert gas prior to its absorption in the aqueous absorbent. This invention may also be used advantageously for the production of other halogenated acids from gas streams containing appropriate hydrogen halides such as, for example, hydrogen bromide and hydrogen fluoride. The term "aqueous absorbent" as used herein includes water, dilute and concentrated hydrochloric acids, and other acids, e.g., sulfuric, if an acid mixture should be desired.

The organic contaminant will generally be a high boiling, chlorinated hydrocarbon, such as trichloroethylene, hexachlorobenzene, and other similar hydrocarbons which are normally found in such HCl gaseous feed streams, as for example, carbon tetrachloride and perchloroethylene. In general, such contaminants are those which have a boiling point of approximately 75° C. or higher, and as used herein, all such contaminants are to be included. The contaminant will generally be present in the incoming gas stream in a quantity of from about 0.1 to about 10 percent on a volume basis of the feed gas stream. The feed gas stream will usually contain more than 50 percent by volume of hydrogen chloride; however, a volumetric concentration of at least about 80 percent hydrogen chloride is preferred.

The term "inert gas" includes air, nitrogen, helium, etc., and any other suitable gas which will reduce the partial pressure of the contaminant but will not condense, dissolve or react with the materials in the system under operating conditions.

The amount of inert gas which is added may vary greatly depending upon the HCl and/or contaminant concentration in the feed gas as well as the desired strength of the hydrochloric acid to be produced. When it is desired to produce 22° Baumé acid, for example, the HCl content of the feed gas stream should be diluted to no less than approximately 40 percent by volume of the total.

The drawing discloses a preferred process and apparatus for the production of hydrochloric acid according to this invention. Referring thereto, the feed gas at a temperature of, for example, about —30° F. is diluted with primary air at about room temperature and introduced through line 1 into the cooler-absorber 2. A dilute hydrochloric acid solution is introduced through line 3 to the cooler-absorber from the tails tower which will be described hereinafter. Recirculated hydrochloric acid may be introduced through line 5 into the cooler-absorber alone or in addition to that coming from line 3. The cooler-absorber 2 is preferably a falling film hydrochloric acid absorber which is a bundle of impervious graphite tubes surrounded by a shell through which cooling water is introduced. Such absorbers are commercially available, and the specific details of construction may be found, for example, in Chemical Engineering Progress, March 1957 (vol. 53, No. 3) pages 139–M through 144–M.

In the process of this invention, the system of equipment is operated at atmospheric pressure by means of the gas vent to the atmosphere from tails tower 4, illustrated in the attached drawing. Since the equipment operates at a constant pressure, the addition of the inert gas to the feed gas stream thus reduces the partial pressure of the contaminants. Such reduction in the partial pressure of the contaminants reduces the ability of the gaseous contaminants to condense, since the partial pressure of such gases must be quite high before they are capable of condensing. Since the temperature of the gaseous feed stream is far below the boiling point of the contaminants, such materials would normally condense, but since the inert gas has been added and the partial pressure thereby reduced, it is not sufficiently high for the gaseous contaminants to condense and be absorbed in the aqueous medium along with the HCl gas.

Since the absorption system is vented to the atmosphere, the addition of inert gas to the feed stream not only reduces the partial pressure of the organic contaminants but also increases the volumetric flow through the equipment and thus reduces the contact time between the gas and liquid in the system. Since the solubility of the HCl in the absorbing liquid, however, is much greater than that of the chlorinated organic contaminants, the dilution of the feed stream by the inert gas has relatively little effect upon the HCl absorption, but effects a great reduction in absorption of the contaminants.

In the cooler-absorber, the diluted acid is concentrated by absorption of the HCl from the feed gas stream; however, the primary air inhibits the condensation and absorption of the organic contaminant. The concentrated acid is removed therefrom through line 6 and introduced into the acid reboiler 7 where volatiles such as free chlorine and some HCl are removed and sent out through line 8. The concentrated product acid is removed from the reboiler through line 9, cooled, and sent to storage. The effluent gas stream from the cooler absorber is removed therefrom through line 10 and diluted with secondary air and sent to the tails tower 4. The vented gas from the reboiler through line 8 is combined therewith prior to introduction. The tails tower 4 may be a conventional packed tower wherein the gas is introduced into the bottom and water is introduced into the top for countercurrent flow wherein a dilute aqueous solution of hydrochloric acid is produced, the latter being introduced to the cooler-absorber 2 through line 3.

The system illustrated in the drawing will now be further described in the following examples:

Example I 6.91 lb.-mols/hr. of a feed gas containing 99.1% HCl, 0.4% TCE (trichloroethylene) and 0.5% $Cl_2$ is mixed with 3.0 lb.-mols/hr. of primary air and introduced into the cooler-absorber. 57.9 lb.-mols/hr. of recirculated hydrochloric acid containing about 35% HCl by weight are introduced to the cooler-absorber through line 5. The effluent gas stream from the cooler-absorber is mixed with 3.85 lb.-mols/hr. of secondary air prior to introduction into the tails tower wher 22.3 lb.-mols/hr. of water is introduced. In this system about 86.25 lb.-mols/hr. of 22° Baumé acid (35.9% HCl by weight) are produced having less than 40 p.p.m. (0.004%) TCE in the product. Acid recirculation is provided to maintain sufficient liquid flow in the cooler absorber so that adequate heat transfer is obtained.

Example II

About 17.25 lb.-mols/hr. of a feed gas having substantially the same composition as that used in Example I was mixed with 7.5 lb.-mols/hr. of primary air and introduced into the cooler-absorber through line 1. No recirculated acid was utilized in this system. The gas effluent from the cooler-absorber through line 10 was mixed with 9.6 lb.-mols/hr. of secondary air prior to introduction into the tails tower wherein 60 lb.-mols/hr. of water was introduced. About 77.4 lb.-mols/hr. of 22° Baumé (36.0% HCl by weight) product acid was produced having less than 40 p.p.m. of TCE in the product.

Example III

About 34.54 lb.-mols/hr. of a feed gas having the same composition of that of Example I was mixed with 15.1 lb.-mols/hr. of primary air and introduced into the cooler-absorber. As in Example II, no recirculated acid was utilized. The cooler-absorber gas effluent was mixed with 19.2 lb.-mols/hr. of secondary air prior to introduction into the tails tower where 124 lb.-mols/hr. of water was added. In this system 156.8 lb.-mols/hr. of 22° Baumé (35.8% HCl by weight) hydrochloric acid was produced having less than 50 parts per million TCE in the product.

Example IV

About 35 lb.-mols/hr. of a feed gas containing 91% HCl, 8.5% TCE (trichloroethylene) and 0.5% $Cl_2$ is mixed with 13.5 lb.-mols/hr. of primary air and introduced into the cooler-absorber through line 1. The gas effluent from the cooler-absorber is drawn off through line 10 and mixed with 16.5 lb.-mols/hr. of secondary air addition prior to introduction into the tails tower where 115 lb.-mols/hr. of water are added. About 131 lb.-mols/hr. of 22° Baumé (35.8% HCl by weight) product acid was produced having less than 60 p.p.m. TCE.

Example V

About 30 lb.-mols/hr. of a feed gas containing 89.7% HCl, 10% TCE (trichloroethylene) and 0.3% $Cl_2$ is mixed with 11.5 lb.-mols/hr. of primary air and introduced into the cooler-absorber through line 1. The gas effluent from the cooler-absorber is drawn off through line 10 and mixed with 15.0 lb.-mols/hr. secondary air prior to introduction to the tails tower wherein 97.8 lb.-mols/hr. water are added. Approximately 111 lb.-mols/hr. of 22° Baumé (35.9% HCl by weight) of product was produced having less than 60 p.p.m. TCE.

In the preferred embodiment of this invention as indicated by the above examples the total amount of air introduced, i.e., primary plus secondary air, was equal to the total volume of HCl present in the feed gas stream.

The process of this invention enables the production of unexpectedly high purity, concentrated hydrochloric acid from an HCl-rich gas stream containing a substantial amount of organic contaminants. Where the gas stream contains about 1% contaminant the presence thereof in the product acid is about 40 p.p.m. and where the contaminant content in the gas stream is about 8%, the product acid contains only about 100 p.p.m. contaminant. While existing processes for the absorption of HCl from gas streams having a relatively low HCl concentration therein are well known, it is contrary to past thinking in the art to dilute the HCl feed gas stream prior to absorption since reduction of vapor pressure would have been expected to make absorption of the HCl less efficient. However, when employing the process of this invention starting with a relatively concentrated gas stream, the controlled dilution is insufficient seriously to inhibit production of an aqueous solution of HCl of high concentration while at the same time sufficient that substantial elimination of contaminant is achieved. The absence of contaminants therein provides a food-grade, laboratory quality C.P. acid suitable for use in a wide variety of applications where a contaminated acid would be wholly unsatisfactory.

Other modes of applying the principle of the invention may be employed, change being made as regards the details described, provided the features stated in any of the following claims or the equivalent of such be employed.

I therefore, particularly point out and distinctly claim as my invention:

1. In a process for the production of concentrated hydrochloric acid comprising a first absorption step of absorbing by a dilute aqueous solution of hydrochloric acid in an aqueous absorber while cooling the same, the hydrogen chloride from an initial hydrogen chloride gas stream containing a substantial amount of chlorinated organic contaminants having a boiling point of at least approximately 75° C. and a second absorption step of absorbing by water the hydrogen chloride and effluent gas stream from said first absorption step, the improvement comprising reducing the partial pressure of said contaminants in said initial and effluent gas streams by dilution with an inert gas prior to each of said first and second absorption steps thereby reducing the contact time between the organic contaminants and the respective absorbing liquids reboiling said concentrated acid solution in a reboiler to expel volatiles therefrom, and contacting said volatiles with said water in said second absorption step.

2. A process according to claim 1 wherein said chlorinated organic contaminant is less than about 10% of the volume of said gas stream prior to dilution.

3. A process according to claim 1 wherein said initial gas stream prior to dilution is at least about 80% hydrogen chloride by volume.

4. A process according to claim 3 wherein said initial gas stream after dilution contains at least about 40% hydrogen chloride by volume and wherein the volume of inert gas used for the dilution of said effluent gas stream is about 10 to 50% greater than that added to said initial gas stream.

5. A process for the production of high purity, concentrated hydrochloric acid from an initial gas stream containing at least 80% hydrogen chloride by volume and chlorinated organic contaminant having a boiling point of at least approximately 75° C. in an amount no greater than about 10% by volume which comprises: (1) adding an inert gas to dilute said initial gas stream in an amount such that the volume concentration of hydrogen chloride is reduced to no less than 40%; (2) absorbing the hydrogen chloride from said diluted initial gas stream in an aqueous absorber with a dilute aqueous solution of hydrochloric acid while cooling the same to produce a concentrated hydrochloric acid reboiling said concentrated acid solution in a reboiler to expell volatiles therefrom, and contacting said volatiles in said water in step (4); (3) adding an additional inert gas to dilute the effluent gas stream from step (2) in an amount by volume of from about 10 to 50% greater than the amount of inert gas added in step (1); (4) absorbing the hydrogen chloride from said diluted effluent gas stream with water to produce a dilute aqueous hydrochloric acid solution; wherein the acid solution produced in step (4) is used as the absorbing acid in step (2).

6. In a process for the production of a concentrated hydrogen halide acid comprising a first absorption step of absorbing by a dilute aqueous solution of such hydrogen halide the hydrogen halide from an initial hydrogen halide gas stream containing a substantial amount of halogenated organic contaminants having a boiling point of at least approximately 75° C. in an aqueous absorber while cooling the same, and a second absorption step of absorbing by water said hydrogen halide in the effluent gas stream from said first absorption step, the improvement comprising reducing the partial pressure of said contaminant in said initial and effluent gas streams by dilution with an inert gas prior to each of said first and second absorption steps, thereby reducing the contact time between the organic contaminant and the respective absorbing liquids reboiling said concentrated acid solution in a reboiler to expel volatiles therefrom, and contacting said volatiles with said water in said second absorption step.

7. A process according to claim 6 wherein said organic contaminant is no greater than about 10% of the volume of said gas stream prior to dilution.

8. A process according to claim 6 wherein said gas stream contains at least about 60% by volume hydrogen halide before dilution and at least 40% by volume after dilution.

9. Apparatus for the production of high purity, concentrated hydrochloric acid comprising in combination: cooler-absorber means for falling film absorption by dilute hydrochloric acid of an HCl gas stream containing a substantial amount of a chlorinated organic contaminant; primary inert gas dilution means for adding inert gas in a predetermined proportion to a feed gas stream prior to introduction into said cooler-absorber means; means for introducing the diluted feed gas stream into said cooler-absorber means; secondary inert gas dilution means for adding inert gas in a predetermined proportion to the effluent gas stream from said cooler-absorber means; means for introducing the diluted effluent gas stream into the base of a tails tower absorber for countercurrent absorption of the diluted effluent gas stream from said cooler-absorber means by water; means for introducing the water into the upper part of the tails tower absorber, the latter having means to introduce dilute hydrochloric acid produced therein leading from said tails tower absorber means into the top of said cooler-absorber means, said tails tower absorber having venting means to vent the unabsorbed contaminant gases therefrom, and acid reboiler means connected to said cooler-absorber means and adapted to receive the concentrated acid therefrom, the reboiler means having further means to expel the volatiles therefrom connected to the base of the tails tower absorber.

References Cited
UNITED STATES PATENTS

| | | | |
|---|---|---|---|
| 2,180,496 | 11/1939 | Balcar | 55—48 |
| 2,220,570 | 11/1940 | Hurt | 55—71 |
| 2,558,011 | 6/1951 | Sprauer et al. | 23—154 |
| 2,901,407 | 8/1959 | Colton | 23—154 |
| 3,165,453 | 1/1965 | Sutter | 23—154 |

OTHER REFERENCES

Gaylord et al.: Chemical Engineering Progress, "The Falling Film Hydrochloric Acid Absorber," vol. 53 (3), pp. 139–M to 144–M.

REUBEN FRIEDMAN, *Primary Examiner.*

C. HART, *Assistant Examiner.*